UNITED STATES PATENT OFFICE.

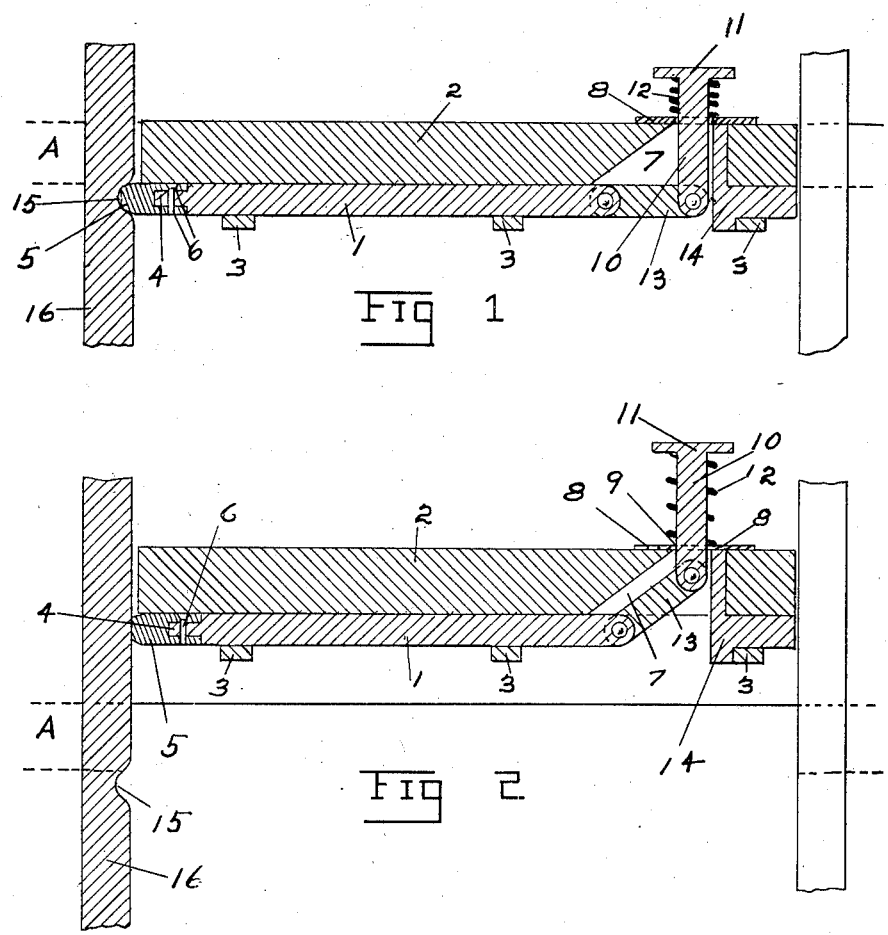

NIELS W. GUDMUNDSON, OF SALT LAKE CITY, UTAH.

ELEVATOR-BRAKE.

1,043,693.  Specification of Letters Patent.  Patented Nov. 5, 1912.

Application filed March 1, 1912. Serial No. 680,984.

*To all whom it may concern:*

Be it known that I, NIELS W. GUDMUNDSON, a citizen of the United States, residing at Salt Lake City, in the county of Salt Lake and State of Utah, have invented certain new and useful Improvements in Elevator-Brakes, of which the following is a specification.

My invention relates to elevator brakes and has for its object to provide a temporary brake for an elevator which is set by the operator to stop the elevator platform exactly even with the floor and may be used with or without the brake on the power of the elevator. These objects I accomplish with the apparatus illustrated in the accompanying drawings in which similar letters of reference indicate like parts throughout the several figures.

Figure 1 is a vertical section longitudinally through the brake and elevator platform and one of the uprights and a vertical elevation of another one of the uprights, showing the brake set at or even with the floor. Fig. 2 is a similar section, showing the brake released.

My apparatus consists of a horizontally carried brake bolt 1, slidably carried below the floor 2 of an elevator platform, by means of the guide hangers 3. Said brake bolt 1 has a portion of one end formed as an extended lug or tenon 4, on which is fitted a brake shoe 5, and detachably held on said tenon by the pin 6. This brake shoe is to provide for easily replacing the wearing parts of my brake. In the floor of the elevator platform is cut an opening 7 over which is fastened a floor plate 8 having a central opening 9 therethrough. Within said opening is made to operate the foot plunger 10, which has a flanged head 11 thereon. Between the said floor plate 8 and said flanged head 11 and carried on the said plunger 10 is the spirally wound spring 12 which normally holds said foot plunger 10 in the position shown in Fig. 2. Between the lower end of said foot plunger 10 and said brake bolt 1, and pivotally connected with each is the link 13. One side of said opening 7 is cut at an incline to receive the said link 13, and the opposite side of said opening has fitted therein a wearing plate 14, which is held and supported in place by another one of the guide hangers 3.

To enable the operator to fully set the brake and to insure the stopping of the elevator platform exactly even with the floors A of the room, an open cut 15 is provided in the side of the upright 16 in the side of the elevator shaft adjacent the brake shoe 5, within which open cut 15 the end of the brake bolt 1 carrying the brake shoe 5 engages when the operator sets the brake to stop at a floor. As will be obvious the elevator platform may be retarded in its ascent or descent when the brake shoe 5 is in friction contact at any point on said upright 16.

In the operation of my apparatus when the operator desires to stop even with a floor he presses on the flanged head 11 of said foot plunger 10 which depresses the plunger and causes the link 13 and plunger bolt 1 to assume the position shown in Fig. 1. When the operator releases the pressure on the flanged head 11 of the foot plunger 10, the spring 12 will raise said foot plunger and the parts connected therewith to the position shown in Fig. 2, leaving the elevator platform to ascend or descend.

Having thus described my invention I desire to secure by Letters Patent and claim:

In an elevator platform brake the combination with an upright having open cuts therein, a plunger bolt, a brake shoe detachably fitted on the end of said plunger bolt, a wearing plate secured in one side of an opening in the elevator platform floor, a foot plunger slidably fitted within said opening and adjacent said wearing plate, a link pivotally connecting said foot plunger and said plunger bolt and a spiral spring carried on said foot plunger adapted to normally hold said foot plunger in a raised position.

In testimony whereof I have affixed my signature in presence of two witnesses.

NIELS W. GUDMUNDSON.

Witnesses:
SAM RANEY,
W. R. WILLIAMS.

Copies of this patent may be obtained for five cents each, by addressing the "Commissioner of Patents, Washington, D. C."